United States Patent [19]

Maige et al.

[11] Patent Number: 5,084,811
[45] Date of Patent: Jan. 28, 1992

[54] PROGRESSIVE START UP DEVICE FOR A SWITCHING POWER SUPPLY

[75] Inventors: Philippe Maige, Sevssinet Parizet; Jean-Marc Merval, Saint Egreve, both of France

[73] Assignee: SGS-Thomson Microelectronics S.A., Gentilly, France

[21] Appl. No.: 318,589

[22] Filed: Mar. 3, 1989

[30] Foreign Application Priority Data

Mar. 4, 1988 [FR] France ............................ 88 03079

[51] Int. Cl.$^5$ ............................................ H02M 3/335
[52] U.S. Cl. ............................................ 363/49; 323/901
[58] Field of Search .................... 363/20, 21, 49, 95, 363/97; 323/901, 908

[56] References Cited

U.S. PATENT DOCUMENTS

| | | | |
|---|---|---|---|
| 3,879,647 | 4/1975 | Hamilton et al. | 363/49 |
| 3,959,714 | 5/1976 | Mihelich | 323/901 |
| 4,180,852 | 12/1979 | Koizumi et al. | 363/49 |
| 4,272,805 | 6/1981 | Iguchi et al. | 363/49 |
| 4,405,975 | 9/1983 | Overstreet et al. | 363/49 |
| 4,494,048 | 1/1985 | Van Den Driessche . | |

FOREIGN PATENT DOCUMENTS 0080915 11/1982 European Pat. Off. .
2431216 7/1979 France .

OTHER PUBLICATIONS

"Switching Regulator Soft Start Circuit", IBM Technical Bulletin, vol. 29, No. 5, Oct. 1986, pp. 2019–2020.

*Primary Examiner*—Peter S. Wong
*Attorney, Agent, or Firm*—Lowe, Price, LeBlanc, Becker & Shur

[57] ABSTRACT

In a switching power supply controlled by modulated width pulses obtained by comparison between a sawtooth voltage (15) oscillating between first and second levels and a servo control voltage (19), the servo control voltage is initially set to a value external to the oscillation interval of the saw-tooth, then, in a first phase, varies up to a first level (dead time) and, in a second phase, varies from the first to the second level for supplying control pulses having progressively increasing widths. A circuit (45, 50) ensures the variation of the servo control voltage during the first phase according to a first slope and then the variation of said servo control voltage during the second phase according to a second slope, lower than the first one, and a circuit (60) causes the slope switching after the detection of the first control pulse.

6 Claims, 3 Drawing Sheets

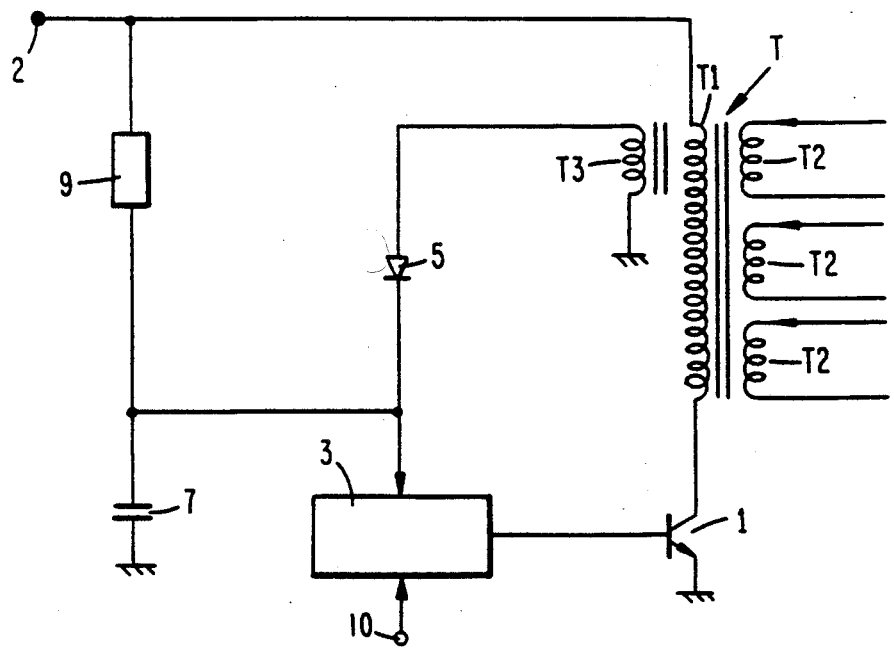
Fig. 1
PRIOR ART
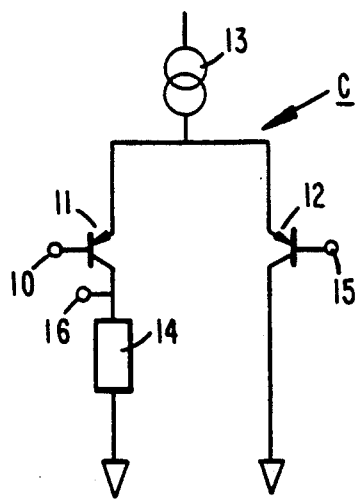
Fig. 2A
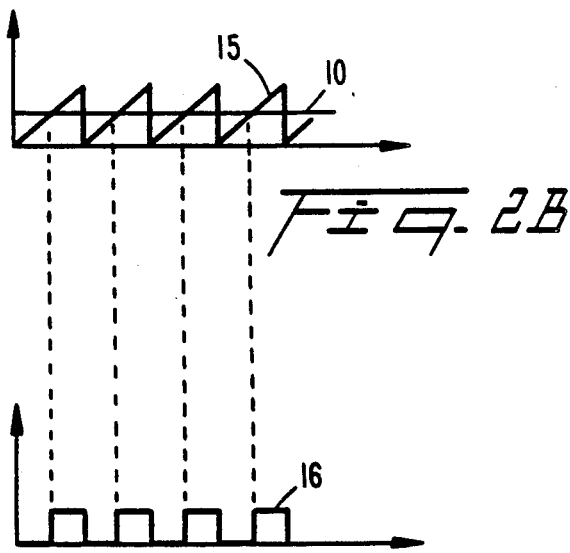
Fig. 2B
Fig. 2C

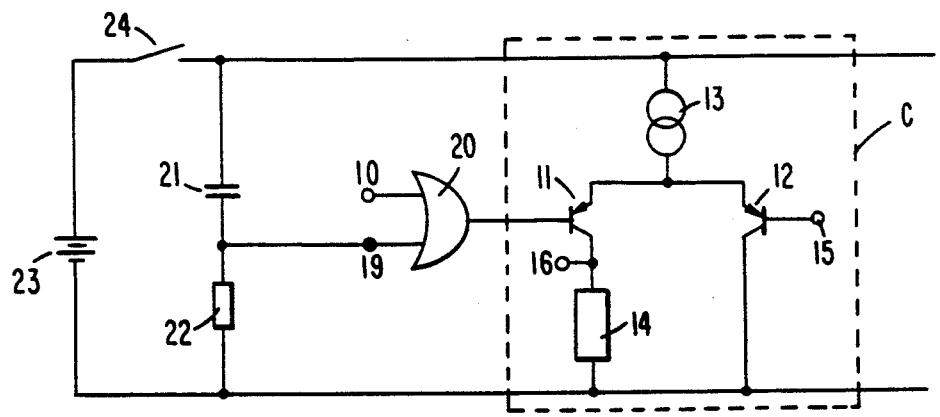
_Fig. 3A_
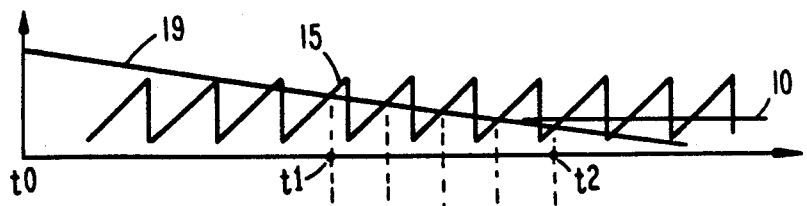
_Fig. 3B_
_Fig. 3C_
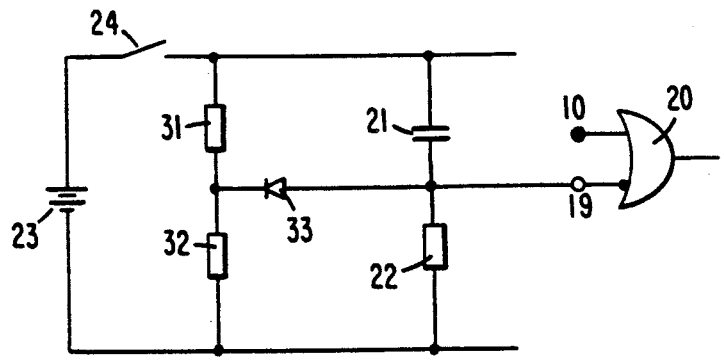
_Fig. 4_ PRIOR ART

PROGRESSIVE START UP DEVICE FOR A SWITCHING POWER SUPPLY

BACKGROUND OF THE INVENTION

The instant invention relates to the field of switching power supply, for example of the type usually used in TV sets.

FIG. 1 is intended to remind some of the main characteristics of a switching power supply. The latter mainly comprises a transformer T, the primary winding $T_1$ of which is connected in series to a power switch, usually a power transistor 1. Thus, current flows in the primary winding $T_1$ between a power supply terminal 2 and the ground when the transistor 1 is switched on. In operation, transistor 1 receives repetitive base control pulses from an integrated circuit 3 and therefore ensures during each of its conduction phases energy transmission from the primary winding $T_1$ to the secondary windings $T_2$ of transformer T. Reference $T_3$ designates a specific secondary winding which is connected through a diode 5 to the integrated circuit of the base control 3 for ensuring its power supply. Thus, the integrated circuit 3 is fed only once the switching power supply is operating. At the switching on of the system, this integrated circuit is not fed by the secondary winding T3. Therefore, one generally provides for an auxiliary circuit comprising a capacitor 7 charged through a resistor 9 connected to the power supply terminal 2 in order to ensure the initial current supply of the circuit before the start up of the switching power supply.

The integrated circuit 3 receives on a terminal 10 servo control signals generated from the signal of at least one of the secondary windings $T_2$, usually through another integrated circuit for supplying a control pulse sequence to the power transistor 1 in order to obtain a stabilized voltage at the secondary. The case under consideration relates to a pulse width modulation control (PWM).

FIG. 2A shows a portion of the integrated circuit 3 permitting the PWM. This figure essentially shows a comparator C comprising two transistors 11 and 12, the emitters of which are interconnected and receive the current from a current source 13 the collector of transistor 12 is directly grounded and the collector of transistor 11 is grounded through a resistor 14. This comparator comprises a first comparison input on the base of transistor 11 corresponding to the terminal 10 hereinabove mentioned, a second comparison input 15 on the base of transistor 12 receiving a saw-tooth signal, and an output 16 on the collector of transistor 11.

FIG. 2B schematically shows the incoming sawtooth signal on terminal 15 and the servo control voltage on terminal 10. FIG. 2C shows the output pulses on terminal 16 designed to control (through amplifying circuits) the base of the power transistor 1. In the specific circuit illustrated here, the nearest the servo control voltage 10 is to the low threshold of the saw-tooth 15, the largest the width of pulses 16 is. Of course, this is an arbitrary choice and an inverse system is liable to be provided for. However, this system will be chosen for the description of the invention that will follow.

At the start up of the switching power supply, the secondary windings are not fed and the servo control signal 10 will be set to a low level causing a maximum energy requirement. The conduction duration of transistor 1 will then be immediately maximal, whereby various drawbacks may arise correlated with the inductive components of the circuit and with saturation risks of the transformer.

In order to avoid those drawbacks, progressive start up circuits for the switching power supply have been provided for in the prior art, a schematical example of which is illustrated in FIG. 3A. FIG. 3A again shows the comparator C of FIG. 2A. However, the servo control signal 10, instead of being directly connected to the base of transistor 11, is connected to this base through an analog OR circuit 20, the function of which is to allow the higher of the two signals it receives on its inputs to flow. The second input 19 of the analog OR circuit 20 is connected to the connection point of a capacitor 21, the other terminal of which is connected to the high voltage source, and of a resistor 22, the other terminal of which is grounded. FIG. 3A also symbolically shows a voltage source 23 and a switch 24 which is switched ON when the circuit is started.

FIG. 3B shows the shape of the input signals on terminals 10, 15 and 19 and FIG. 3C shows the shape of the control pulses on the output terminal 16. At the switching ON time $t_0$ of switch 24, terminal 19 is at a high voltage and this voltage drops while the capacitor 21 is being charged. The saw-tooth 15 starts appearing after a given time and, at a time $t_1$, the signal on terminal 19 reaches the highest level of the saw-tooth 15. At that time, a first pulse is supplied at the output, that is, the switching power supply starts operating. Then, while the voltage on terminal 19 decreases, pulses having progressively increasing widths are supplied at the output terminal 16 until a time $t_2$ when the servo control voltage on terminal 10 gets operative.

It will be noted that FIGS. 3B and 3C are shown for the sake of illustration and are not drawn to scale. Indeed, conventionally, in a TV switching power supply, the period of the saw-teeth corresponds to the TV line scanning period, that is, for example, 64 microseconds. The duration of the initial dead time between the times $t_0$ and $t_1$ is about hundred microseconds, and the duration of the progressive start up between the times $t_1$ and $t_2$ is also about hundred microseconds, that is, the decrease of signal 19 is spread over a few thousands of saw-tooth periods.

The various devices hereinabove described are commercially available and are for example used in the switching power supply circuits for TV sets marketed under references TEA 5170, UAA 4001, UAA 4006 by the company SGS-Thomson Microelectronics SA.

This circuit has proved satisfactory as regards the progressive start up between the times $t_1$ and $t_2$. However, it presents a drawback since there is a significant dead time between the times $t_0$ and $t_1$, that is, between the feed instant and the occurrence of the first control pulses.

In order to palliate this drawback, it has been proposed in the prior art to ensure an initial charge of the capacitor 21 close to the high threshold of the sawtooth with a circuit of the type illustrated in FIG. 4. This circuit again includes, in addition to the components already described in FIG. 3A, two resistors 31 and 32 connected in series between the high and low power supply terminals, the junction of which is connected to the junction of capacitor 21 and resistor 22 through a diode 33. Thus, the voltage on terminal 19, instead of starting from the high value $V_{CC}$ of the power supply voltage, starts from a value equal to $V_{CC}[R1/(R1+R2)]+VD$, VD being the forward voltage drop in the diode 33. As a result, the period between the times $t_0$ and $t_1$ is decreased. Such a device is used for example in the circuits referenced TEA 2164 and TEA 2029 marketed by the company SGS-Thomson Microelectronics SA, the components 31, 32 and 33 being external to the integrated circuit for the TEA 2029 and internal for the TEA 2164. With this device, the dead time between the times $t_0$ and $t_1$ is reduced but the accuracy of the system is not very satisfactory since it depends upon the accuracy on the resistors R1 and R2 and upon that on the saw-tooth amplitude as well as upon the drift caused by the diode 33. For this reason, a security range is to be provided and there still remains a dead time, which is of course lowered with respect to that of the previous process, but which presents the drawback of being highly scattered from one circuit to another.

One of the drawbacks of the relatively high dead times is of course the annoyance caused to the televiewer who will have to wait for some time until he receives the picture signals. Another drawback, that can be seen in relation with the drawing of FIG. 1, is that, if a relatively high dead time is provided, the capacitor 7, ensuring the initial power supply of the integrated circuit as long as the switching power supply is not set to a steady state, will have to exhibit a very high value and the resistor 9 in series with this capacitor shall not have a too high value for permitting the rapid charge of capacitor 7 at the switching on. If the dead time is reduced, it will be possible to reduce the value of capacitor 7 and increase the value of resistor 9, which reduces the consumption during the steady state period.

Thus, an object of the instant invention is to reduce the duration of the dead time while ensuring a satisfactory progressive start up.

Another object of the instant invention is to provide for such a circuit, most components of which are liable to be realized in the form of integrated circuits.

SUMMARY OF THE INVENTION

Those objects of the instant invention are attained by providing for a progressive start up circuit for a switching power supply controlled by modulated-width pulses obtained by comparison between a saw-tooth voltage oscillating between first and second levels and a servo control voltage wherein the servo control voltage is initially set to a value external to the oscillation interval of the saw-tooth, then, in a first phase varies up to a first level (dead time) and in a second phase varies from the first to the second level for supplying control pulses having progressively increasing widths. This circuit comprises means for ensuring the variation of the servo control voltage during the first phase according to a first slope, then the variation of this servo control voltage during the second phase according to a second slope, lower than the first one, and means for ensuring the switching of the slope after the detection of the first control pulse.

According to an embodiment of the instant invention, means for supplying a variable voltage comprise means for injecting a constant current into a capacitor, this constant current being able to be switched between at least first and second predetermined values.

BRIEF DESCRIPTION OF THE DRAWINGS

Those objects, features, advantages and others of the instant invention will clearly appear from the following detailed description of preferred embodiments, in connection with the attached drawings, wherein:

FIGS. 1, 2A-2C, 3A-3C and 4 intended to illustrate the prior art have been described hereinabove;

In the various figures, the same reference numerals designate identical or similar components.

DETAILED DESCRIPTION OF THE INVENTION

Figure 5:
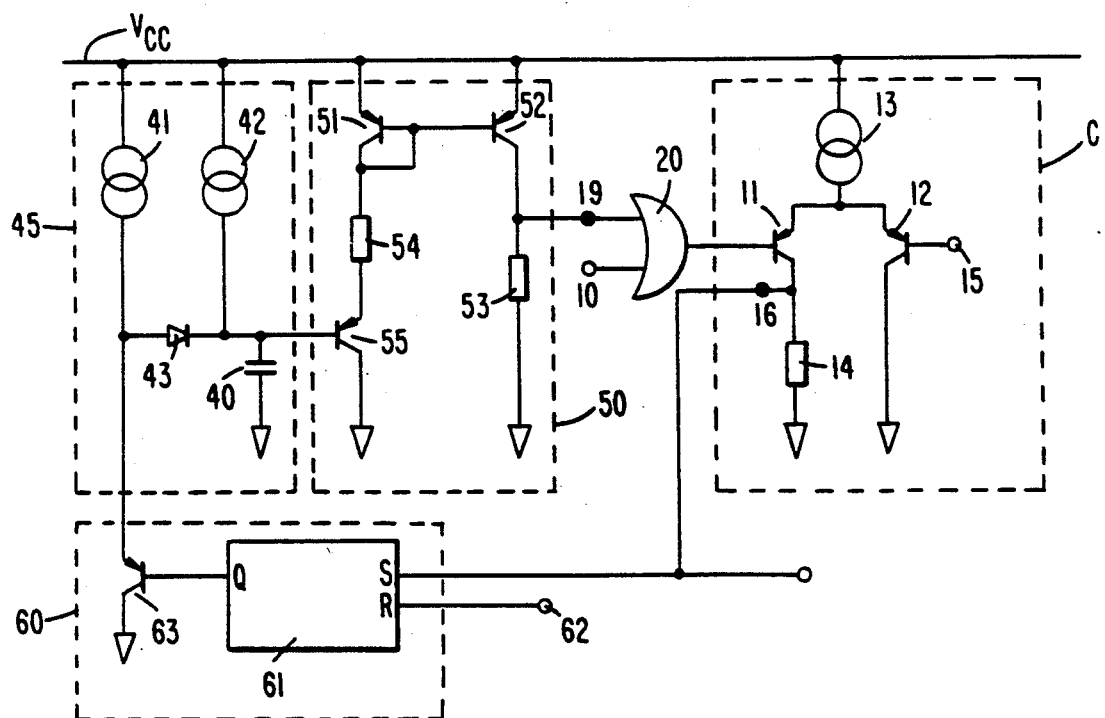
FIG. 5 shows an embodiment of the progressive start up circuit according to the instant invention.
Figure 6A:
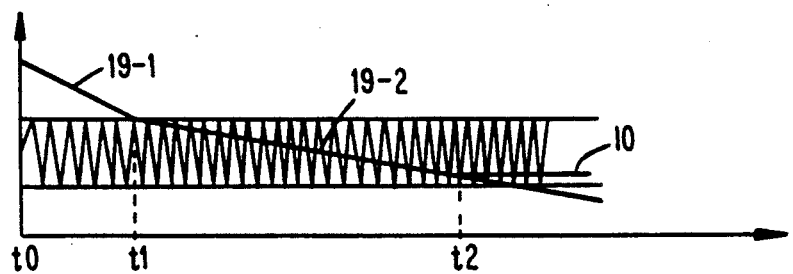
FIGS. 6A and 6B show time diagrams intended to explain the operation of the circuit of FIG. 5.
Figure 6B:
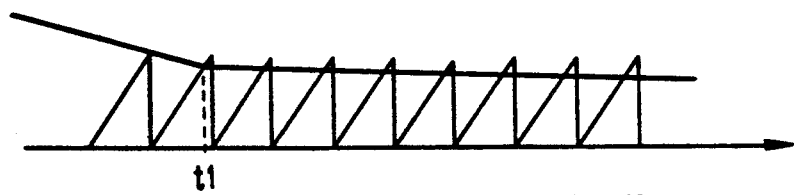

FIG. 5 shows again the comparator C of FIGS. 2A and 3A, comprising the components referenced 11 to 16, as well as the analog OR gate 20 associated with the inputs 10 and 19.

The circuit according to the instant invention differs from the circuits of the prior art by the way the signal is supplied on the terminal 19 for ensuring the progressive start up. According to the invention, this signal is determined by the charge of a capacitor 40 which, in a first phase corresponding to the dead time, is relatively rapidly charged by the concomitant action of the two current sources 41 and 42 while, during the start up per se (between the above-mentioned times $t_1$ and $t_2$), the charge is ensured by only one of the two current sources (42) the value of this only current source being substantially lower than the sum of the values of both current sources, for example 10 to 30 times lower. Thus, the dead time will be low with respect to the duration of the progressive start up.

In a more detailed way, the circuit of FIG. 5 comprises, between a high voltage source $V_{CC}$ and the ground, the above-mentioned comparator C, a charging circuit 45 of the capacitor 40, an inverting circuit 50, and a circuit 60 for detecting the time when the operation of the switching power supply starts and for switching the above-mentioned current sources.

In the preferred embodiment illustrated, the circuit 45 comprises the capacitor 40, one terminal of which is grounded and the other terminal of which is connected to the power supply source through the current source 42 and the connection in series of the current source 41 and a diode 43. The intensity of the current source 41 is substantially higher than the intensity of the current source 42. The second terminal of capacitor 40 is connected to the input of a phase inverter 50, the output of which is connected to the input terminal 19 of the analog OR gate 20.

By way of example, the phase inverter comprises two transistors 51 and 52 forming a current mirror, that is, their emitters are connected to the high voltage $V_{CC}$, their bases are interconnected, the base of transistor 51 is connected to its collector and the collectors of transistors 51 and 52 are grounded through charges. To the collector of transistor 52 is connected a resistor 52 and to the collector of transistor 51 is connected a resistor 54 in series with a transistor 55, the base of which receives the voltage across capacitor 40.

The circuit 60 comprises an RS flip-flop 61, the R input of which is connected to a terminal 62 which receives a signal when the switching power supply is fed, the S input of which is connected to the output 16 of compararactor C and the Q output of which is connected to the base of a transistor 63. This transistor 63 is connected between, on the one hand, the junction of the current source 41 and the diode 43 and, on the other hand, the ground.

Thus, at the time of feeding the switching power supply, between the times $t_0$ and $t_1$, the transistor 63 is in the OFF state and the current sources 41 and 42 flow together in the capacitor 40 in order to supply a rapid charge, what supplies, after a phase inversion, on the terminal 19, a rapidly decreasing signal 19-1. At the time $t_1$, as seen hereinabove, a first pulse having a short lifetime occcurs at the output 16 of the comparator. Consequently, the flip-flop 61 switches and the transistor 63 is set conductive, whereby the current source 41 is shorted towards the ground and only the current source 42 flows in the capacitor 40 which is therefore charged more slowly, and the desired progressive start up between the times $t_1$ and $t_2$, as hereinabove described, is then obtained.

This circuit presents the advantage of substantially reducing the dead time and of being self-adaptive since the circuit is operative and the duration of the dead time is roughly the same, independently of the variations of the various components.

Of course, the circuit of the instant invention is liable of numerous variations and modifications as regards the realization of blocks 45, 50 and 60 and of comparator C.

For example, if instead of grounding the capacitor 40, one provides a connection of this capacitor so as to initially draw a high voltage and then a slowly decreasing voltage, the inverter 50 would then be useless.

On the other hand, an analog OR gate for processing either the progressive start up signal 19 or the control signal 10 has been described for the sake of simplicity. It could be conceivable that each of those signals is applied to a comparator of the type of comparator C and then the logic signals resulting from those two comparators are applied to an AND gate so that only the square pulses having the shortest duration are used for controlling the base of the power transistor of the switching power supply.

Finally, other circuits are liable to replace the detection and switching circuit 60.

We claim:

1. A progressive start up device for a switching power supply controlled by modulated width pulses obtained by comparison between a saw-tooth voltage (15) oscillating between first and second levels and a servo control voltage (19) wherein the servo control voltage is initially set to a value external to the oscillation interval of the saw-tooth, then, in a first phase, varies towards said first level (dead time) and, in a second phase, varies from said first to said second level for supplying control pulses having progressively increasing widths, comprising means (45, 50) for ensuring the variation of the servo control voltage during the first phase according to a first slope and then the variation of this servo control voltage during the second phase according to a second slope, less than the first slope, and detecting and switching means (60) for ensuring the switching of the slope after the detection of the control pulses.

2. A progressive start up device for a switching power supply according to claim 1, wherein said servo control voltage is initially provided by means (41, 42) for injecting a constant current into a capacitor (40), this constant current being switchable between at least first and second predetermined values.

3. A progressive start up device for a switching power supply according to claim 2, wherein said means for injecting a constant current into said capacitor (40) comprise a first current source (41) having a high value and a second current source (42) having a low value, said current sources having a first terminal connected to a high power supply ($V_{CC}$) and a second terminal connected to said capacitor (40), the first current source being connected to said capacitor (40) through a diode (43), the connection point of the first current source and of the diode being liable to be grounded through said detecting and switching means (60) when the control pulses are detected.

4. A progressive start up device for a switching power supply according to claim 3, wherein the first current source has a value ten to thirty times higher than the second current source.

5. A progressive start up device for a switching power supply controlled by modulated width control pulses obtained by comparison between a saw-tooth voltage (15) oscillating between first and second levels and a servo control voltage (19) wherein the servo control voltage is initially set to a value greater than said first and second levels of the saw-tooth, then, in a first phase, varies towards said first level (dead time) and, in a second phase, varies from said first to said second level for supplying said control pulses having progressively increasing widths, comprising:

comparator means (C) for detecting said servo control voltage being equal to said first level and, in response, supplying said control pulses;

switching means (60) for supplying a switching signal in response to said control pulses and to an external indicating initial start up of said switching power supply;

servo control voltage generating means (45) for generating said servo control voltage including a capacitor (40) and means (41, 42) for injecting a constant current into said capacitor (40), said constant current selectable between first and second predetermined values in response to said switching signal; and inverter means (50) for receiving a voltage across said capacitor (40) and, in response, providing said servo control voltage whereby the servo control voltage during the first phase varies according to a first slope and then the variation of said servo control voltage during the second phase varies according to a second slope less than the first slope.

6. A progressive start up device for a switching power supply according to claim 5, wherein said means for injecting a constant current into said capacitor (40) comprise a first current source (41) having a high value and a second current source (42) having a low value, said current sources having a first terminal connected to a high power supply ($V_{CC}$) and a second terminal connected to said capacitor (40), the first current source being connected to said capacitor (40) through a diode (43), a connection point of the first current source and of the diode being grounded through said switching means (60) in response to said control pulses.

* * * * *

UNITED STATES PATENT AND TRADEMARK OFFICE
CERTIFICATE OF CORRECTION

PATENT NO. : 5,084,811

DATED : January 28, 1992

INVENTOR(S) : Maige et al.

It is certified that error appears in the above-identified patent and that said Letters Patent is hereby corrected as shown below:

Column 5, Line 46, delete "(15)";
          Line 47, delete "(19)";
          Line 53, delete "(45,50)";
          Line 58, delete "(60)";
          Line 63, delete "(41,42)";
          Line 64, delete "(40)".

Column 6, Line 5, delete "(40)";
          Line 6, delete "(41)";
          Line 7, delete "(42)";
          Line 9, delete "($V_{CC}$)";
          Line 10, delete "(40)";
          Line 11, delete "(40)";
          Line 12, delete "(43)";
          Line 14, delete "(60)";
          Line 23, delete "(15)";
          Line 24, delete "(19)";
          Line 31, delete "(C)";
          Line 34, delete "(60)";
          Line 38, delete "(45)";
          Line 40, delete "(40)" and "(41,42)";
          Line 41, delete "(40)";
          Line 45, delete "(50)";
          Line 46, delete "(40)";
          Line 54, delete "(40)";
          Line 55, delete "(41)";
          Line 56, delete "(42)";
          Line 58, delete "($V_{CC}$)";
          Line 59, delete "(40)";

UNITED STATES PATENT AND TRADEMARK OFFICE
CERTIFICATE OF CORRECTION

PATENT NO. : 5,084,811

DATED : January 28, 1992

INVENTOR(S) : Maige et al.

It is certified that error appears in the above-identified patent and that said Letters Patent is hereby corrected as shown below:

Column 6, Line 60, delete "(40)";
          Line 61, delete "(43)";
          Line 63, delete "(60)".

Signed and Sealed this

Twelfth Day of July, 1994

Attest:

BRUCE LEHMAN

*Attesting Officer*      Commissioner of Patents and Trademarks